United States Patent [19]

Lindner

[11] 4,389,234
[45] Jun. 21, 1983

[54] GLASS COATING HOOD AND METHOD OF SPRAY COATING GLASSWARE

[75] Inventor: Georg H. Lindner, Vlissingen, Netherlands

[73] Assignee: M&T Chemicals Inc., Woodbridge, N.J.

[21] Appl. No.: 359,441

[22] Filed: Mar. 18, 1982

[51] Int. Cl.³ .............................................. C03C 17/00
[52] U.S. Cl. ........................................ 65/60.1; 65/181; 118/314; 118/326; 118/603; 427/424
[58] Field of Search .................. 65/60.1, 181; 118/326, 118/314, 602, 603; 427/424

[56] References Cited

U.S. PATENT DOCUMENTS

| | | | |
|---|---|---|---|
| 2,155,932 | 4/1939 | Davis | 118/326 X |
| 3,311,085 | 5/1965 | Smith. | |
| 3,353,514 | 11/1967 | Lyle | 65/60.1 X |
| 3,422,793 | 1/1969 | Lachman | 118/326 X |
| 3,516,811 | 6/1970 | Gatchet et al. | |
| 3,677,729 | 7/1972 | Plumat. | |
| 3,684,469 | 8/1972 | Goelzer et al. | |
| 3,819,404 | 6/1974 | Scholes et al. | |
| 3,906,895 | 9/1975 | Morino et al. | 118/314 |
| 3,933,457 | 1/1976 | Scholes. | |
| 4,002,143 | 1/1977 | Dover. | |
| 4,044,175 | 8/1977 | Coxon et al. | 118/602 |
| 4,053,328 | 10/1977 | Oka et al. | 118/602 |
| 4,201,562 | 5/1980 | Hofmann et al. | |

*Primary Examiner*—Arthur D. Kellogg
*Attorney, Agent, or Firm*—Stanley A. Marcus; Franklyn Schoenberg; Sheldon H. Parker

[57] ABSTRACT

A coating hood adapted to uniformly apply protective coatings to the exterior of hot glass containers is disclosed. The hood comprises a tunnel for allowing the containers to pass therethrough, and an adjustable top for accommodating containers of various sizes. At least two jet slots are located in each side wall, and at least two receiver slots in the opposite side wall are aligned therewith. The jet slots and the suction slots are interspersed opposite to each other in each side wall. The coating compound is introduced through at least one feedpoint, and blowers secured to the side walls furnish high velocity air containing the coating compound. Baffles are situated in the flow path of the high velocity air so that the jets issuing from the jet slots are well defined. Two or more closed recirculating loops are defined by the judicious selection of blowers, jet slots and receivers. The coating compound is fed into the innermost loop, and the eddy currents created between adjacent loops by the closely spaced, oppositely directed jets transfer the coating compound to the outermost loop. In such manner, the outer loop will have a lower coating compound concentration and consequently, a lower loss of coating compound to the exhaust than would occur with conventional coating hoods. Such losses may be further reduced by having the outer loop function as an air curtain over the full height of the coating hood, thus limiting the amount of ambient air entering the hood.

22 Claims, 13 Drawing Figures

GLASS COATING HOOD AND METHOD OF SPRAY COATING GLASSWARE

DESCRIPTION OF THE PRIOR ART

The desirability of uniformly applying protective coatings for the exterior of hollow glass containers has been long recognized. Such coatings, which include tin, titanium, or other heat decomposable metallic compounds, or organometallic compounds, protect the glass containers from surface damage, such as abrasions and scratches. Surface damage results in a loss of tensile strength for the glass containers. The need for high-tensile strength in glass containers is particularly acute when the containers are mass-produced, moved rapidly in close proximity along high speed conveyor lines, and are subsequently filled with carbonated beverages, beer, wine, foodstuffs, etc. that produce gaseous pressure within the containers.

Such protective coatings are usually applied as the glass containers emerge in a heated, fully shaped condition from a glassware forming machine, i.e., at the "hot end" of the system. The containers are transported away from the forming machine by a conveyor. Temperatures in excess of 800° F. exist at the surface of the glass containers, so that when a heat decomposable metallic or organometallic compound is applied thereto, the compound decomposes immediately and is converted to a metallic oxide coating.

One well-known and widely used technique for applying a protective coating to the hot glass containers calls for spraying the opposite sides of the containers as they traverse, on a conveyor, in single file, two longitudinally spaced, oppositely positioned spray heads. Each spray head covers approximately 180° of the circumference of the bottle, so that two spraying stations are required to coat the entire bottle. A first receiver is situated across the conveyor and in alignment with the first spray head. A second receiver is situated opposite to, and in longitudinal alignment with, the second spray head. Pressurized Air and the coating compound are delivered at a positive pressure and in the appropriate proportions for discharge from the spray heads. The receivers are connected to a negative pressure source so that the coating compound that does not adhere to the container is vented to atmosphere, or recaptured. The net pressure differential also forces the coating compound out of the spray heads at a significant velocity for improved effectiveness. Coating systems, as generally described above, are disclosed in U.S. Pat. No. 3,516,811, granted June 23, 1970 to G. L. Gachet et al, U.S. Pat. No. 3,684,469, granted Aug. 14, 1972 to W. C. Goelzer et al, and U.S. Pat. No. 4,002,143, granted Jan. 11, 1977 to Jerry D. Dover.

The above-described coating systems, however, are open-ended and are thus adversely influenced by ambient conditions in the factory where the glass containers are formed. The ambient conditions of prime concern are rapidly moving air currents, the moisture content in the air, and the potentially toxic fumes and pollutants issuing from the spray heads. The air currents can set up turbulent conditions at the spray heads that will cause a preferential, or uneven, application of the protective coating which causes an undesirable streaking of the protective coating. In order to compensate for the air currents, the above-described systems are operated at higher pressures and with greater throughput of coating compound than would be required under quiescent conditions. The moisture problem, which leads to hydrolysis loss by rendering some of the coating compound unfit for its intended purpose, is particularly acute when inorganic coating compositions, such as tin tetrachloride and titan(t)ium tetrachloride, are utilized. The escape of potentially toxic fumes and pollutants into the atmosphere at the work place may violate Federal, state and local ordinances. Also, the efficiency of such systems is low for most of the relatively expensive coating compound is wasted.

A second, well-known and widely employed technique for applying a protective coating to hot glass containers relies upon a formed, sheet metal coating hood with spray heads and associated receivers situated therein. The coating hood obviates many of the problems associated with the open-ended spray systems discussed above. For example, the hood isolates, in some measure, the glass containers to be coated from the ambient conditions and furnishes a better controlled atmosphere that enhances the coating operation.

The metallic compound is applied as the glass containers pass, in single file, through a tunnel defined within the coating hood. The tunnel is of sufficient width to allow the containers to pass therethrough and is of sufficient height to accomodate the tops of the glass containers. Usually two spray heads are spaced along the longitudinal dimension of the hood, one spray head being present in each side wall. A first receiver is positioned in one side wall in alignment with the first spray head, and a second receiver is positioned in the opposite side wall in alignment with the second spray head. The spray heads are fed from a remote source with a mixture of air, or gas, and the metallic compound to be used for coating. Also, air circulating devices, such as blowers, discharge into the coating hood to assist in the distribution of the coating for the containers. The metallic compound is discharged from the spray heads as a vapor or as a finely divided spray. Exhaust fans operatively associated with the receivers recover some of the vapor or spray that does not adhere to the containers, and also prevent the fumes from escaping from the hood.

Representative coating hoods are disclosed in U.S. Pat. No. 3,819,404, granted June 25, 1974 to Addison B. Scholes and Joseph J. Kozlowski and in U.S. Pat. No. 3,933,457, granted Jan. 20, 1976 to Addison B. Scholes. To illustrate, Scholes et al discloses an apparatus for treating glassware within an enclosed chamber 14 wherein the chamber is maintained substantially moisture free. The apparatus includes an entrance end 16 and an exit aperture 24, and utilizes a plenum chamber 28 for distributing treatment gas within the enclosure at high velocity through vertically extending slots 34. The slots are sized and positioned to provide a uniform flow of treatment gas into the treatment chamber, as shown in FIGS. 2 and 4. FIG. 3 of Scholes et al schematically indicates that a saturated mixture of the coating compound at the top of tank 40 is mixed with a pressurized carrier gas, such as air in tank 48, and is transmitted, at high velocities and pressure, to plenum 28 for distribution through slots 4 into chamber 14. The chamber 14 is exhausted through vent 35.

Scholes discloses a similar coating hood 10 that has an entrance aperture 13 and a discharge aperture, the hood being mounted over a conveyor belt 17. Hollow distribution legs 25 supply the treatment gas to the interior of the hood, as shown in FIG. 2. Gas burners 22 maintain the interior of the enclosure at an elevated temperature.

The above described known coating systems, whether employing a coating hood or not, are relatively inefficient, generally attaining a coating efficiency ranging between 5% and 10%. Phrased in another manner, in the least efficient system, only 5% of the coating compound introduced into the hood actually forms a metal oxide coating on the glass container; in the most efficient system, only 10% of the coating compound actually forms a metal oxide coating. The large remaining percentage of the coating compound (95% to 90%) does not participate in the formation of the desired metal oxide film.

The low efficiencies of known systems are attributable to three factors, namely (1) hydrolysis losses, (2) homogenous reaction losses, and (3) ventilation losses. Hydrolysis losses occur when moisture laden air contacts vaporized coating compound, and causes degradation of the coating compound, thus rendering same unsuitable for forming uniform protective coatings on the glass containers. Hydrolysis losses may be a problem when the coating compound is an inorganic metallic compound, such as titanium tetrachloride or tin tetrachloride. Homogenous reaction losses may occur when the coating compound decomposes before it contacts the hot surface of the glass container—such problem is particularly acute with organometallic coating compounds. Ventilation losses pertain to the escape of the coating compound from the coating chamber due to air movement, for air acts as as carrier for the coating compound.

Homogenous reaction losses can be reduced by increasing the velocity at which the coating compound is sprayed onto the heated glass containers. Such increase in air velocity, however, exacerbates the ventilation losses.

SUMMARY OF THE INVENTION

The present invention relates to a unique coating hood that functions with an efficiency unknown and unobtainable with known coating systems. Such hood minimizes ventilation losses, while not aggravating existing hydrolysis losses and/or homogenous reaction losses.

Such advantageous results are attributable to a coating hood configuration that vigorously and thoroughly intermixes the coating compound and its carrier gas (usually air), avoiding introduction of vast amounts of ambient air. The hood employs several pairs of air jets with a like number of pairs of aligned suction slots in the opposite side wall. Baffles may assist in the formation of such air jets. Blowers are operatively associated with the hood to insure the circulation of air and coating compound therethrough at high velocities, and a feed-point(s) is provided to facilitate the introduction of the coating compound into the path of the circulating air.

One pair of the aforementioned air jets and suction slots is designated as an inner loop. Another pair of jets and slots is designated as an outer loop. The inner loop passes through the hood at high velocity in order to create turbulent conditions at the bottle surface when passing through. Turbulence may be assisted by using many small holes instead of one big opening through which the air from the inner loop enters the hood. The outer loop enters the hood preferably through one vertical slot over most of the hood height with opposite suction slots. The air velocity is preferably kept at such speed that this air film jet acts as an air curtain in which only a limited amount of air from the outside is introduced. In between the two loops one or more intermediate loops may be present. Coating compound is introduced into the inner loop and vigorously contacted with the hot bottle surface. A minimal amount of air may either carry the coating compound as a vapour or atomize the compound into the inner air loop. Any unused coating compound that does not react with the containers passing through the hood is transferred to the next loop, principally through air exchange between the adjacent jets. The loops may circulate in the same direction or alternating in opposite direction.

The coating compound not reacted in the inner loop gets a second chance to react at the bottle surface and, in the case of a three loop system, a third chance, etc. The concentration of the coating compound is lower in the outer loop than in the inner or middle loops. Any air flow from the outer loop into the hood exhaust system therefore contains a minimal amount of coating compound, whereas much more of the coating compound ends upon the bottle wall.

Furthermore, the instant coating hood is versatile and can efficiently coat glass containers of different heights by utilizing a vertically adjustable top that can be moved relative to the side walls of the hood. Also, the hood has exhaust ports at both its entrance and exit ends, and such ports prevent the escape of harmful fumes into the atmosphere.

Other significant advantages realized by the instant coating hood will become readily apparent from the appended drawings and the ensuing description of the invention.

DESCRIPTION OF THE DRAWINGS

FIG. 8 is situated adjacent to FIG. 1;

DETAILED DESCRIPTION OF THE DRAWINGS

Figure 1:
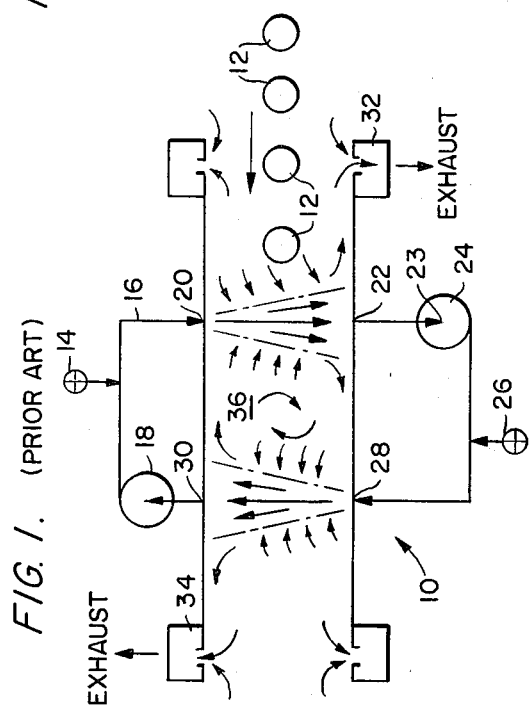
FIG. 1 is a schematic representation of one configuration of a know coating hood.

FIG. 1 schematically represents one well-known coating hood, indicated generally by reference numeral 10, for coating glass containers at the "hot end" of a glass manufacture line. The containers 12, while at a temperature of 800° F. or more, are transported, in single file, by a conveyor (not shown) through a tunnel formed in the hood 10. Coating compound is introduced into the hood 10 at a first feedpoint 14, and the coating compound is combined in line 16 with pressurized air from blower 18. The coating compound and the air are discharged from nozzle 20 against one side of each container passing thereby. A receiver 22 is aligned laterally with nozzle 20 and the receiver is operatively associated with the intake port 23 of a second blower 24. The receiver 22 recaptures a portion of the unused coating compound.

Coating compound is introduced into the hood at a second feed point 26, and the coating compound is mixed with pressurized air from the outlet port of blower 24 before being discharged from nozzle 28 against the other side of each container passing thereby. A receiver is aligned laterally with nozzle 28 and the receiver is operatively associated with the intake port of blower 18. In effect, coating hood 10 employs a single closed loop system for coating the diametrically opposed sides of containers 12 in a two-step procedure.

Nozzles 20 and 28 discharge the carrier air and coating compound in a fan-shaped pattern. While the receivers 22 and 30 recover a fraction of the overspray and/or unreacted coating compound, most of the unreacted coating compound is entrained with the air current flowing into exhausts 32, 34 situated at the entrance and exit ends of the coating hood 10, respectively. A quiescent zone 36 is defined between the fan-shaped spray patterns issuing from nozzles 20 and 28, for the spray patterns do not overlap.

Figure 2:
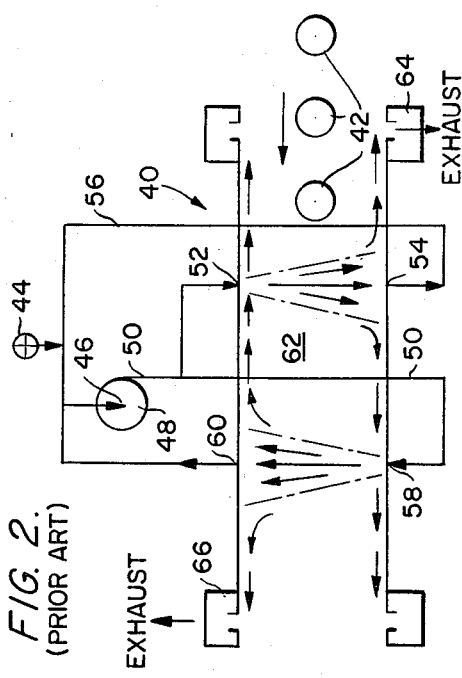
FIG. 2 is a schematic representation of another configuration of a known coating hood.

FIG. 2 represents a similar coating hood, in which, however, the closed loop is circulated by one fan 46 instead of two fans. This way the coating compound may be introduced at one point 44 instead of at two points as in FIG. 1.

Both embodiments of conventional spray hoods 10 and 40 are hampered by the formation of quiescent zones and significant amounts of coating compound are drawn into the exhaust system because of the significant flow of air along the interior surfaces of the side walls of the hood.

In contrast to the conventional coating hoods 10 and 40 depicted in FIGS. 1 and 2, FIGS. 3–7 depict a unique, novel coating hood constructed in accordance with the principles of this invention, such hood being identified generally by reference numeral 110. The hood is operatively associated with a conveyor belt 111 which moves longitudinally through the hood and conveys glass containers 112 to be coated.

The hood 110 includes inter alia, a vertically adjustable top 114 that extends longitudinally between the leading end 116 and the trailing end 118 of the hood. The top 114 also extends laterally across the hood between side walls 120 and 122, and has a rectangular, upwardly opening shape. A first set of vertically extending slots 124 is formed in one side wall of the top, a second, identical set of vertically extending slots 125 is formed in the other side wall. The slots are aligned with each other vertically and longitudinally.

Four matching ears 126 are spaced longitudinally along the upper edge of side wall 120; similarly, a matching set of ears 128 is spaced longitudinally along the upper edge of side wall 122. An aperture is formed in each ear 126, 128. Threaded fasteners 130 are inserted through slots 124 in the top 114 and through the corresponding apertures in ears 126, wing nuts 132 are advanced onto the fasteners until the top is secured in the desired position. In the same fashion, threaded fasteners 131 are inserted through slots 125 in the top and through the corresponding apertures in ears 128; wing nuts 133 are then advanced onto the fasteners until the top is secured in the desired position. The extent of vertical movement for top 114 is suggested by the directional arrows in FIG. 3; such movement enables the coating hood to be utilized with glass containers of various sizes.

Figure 3:
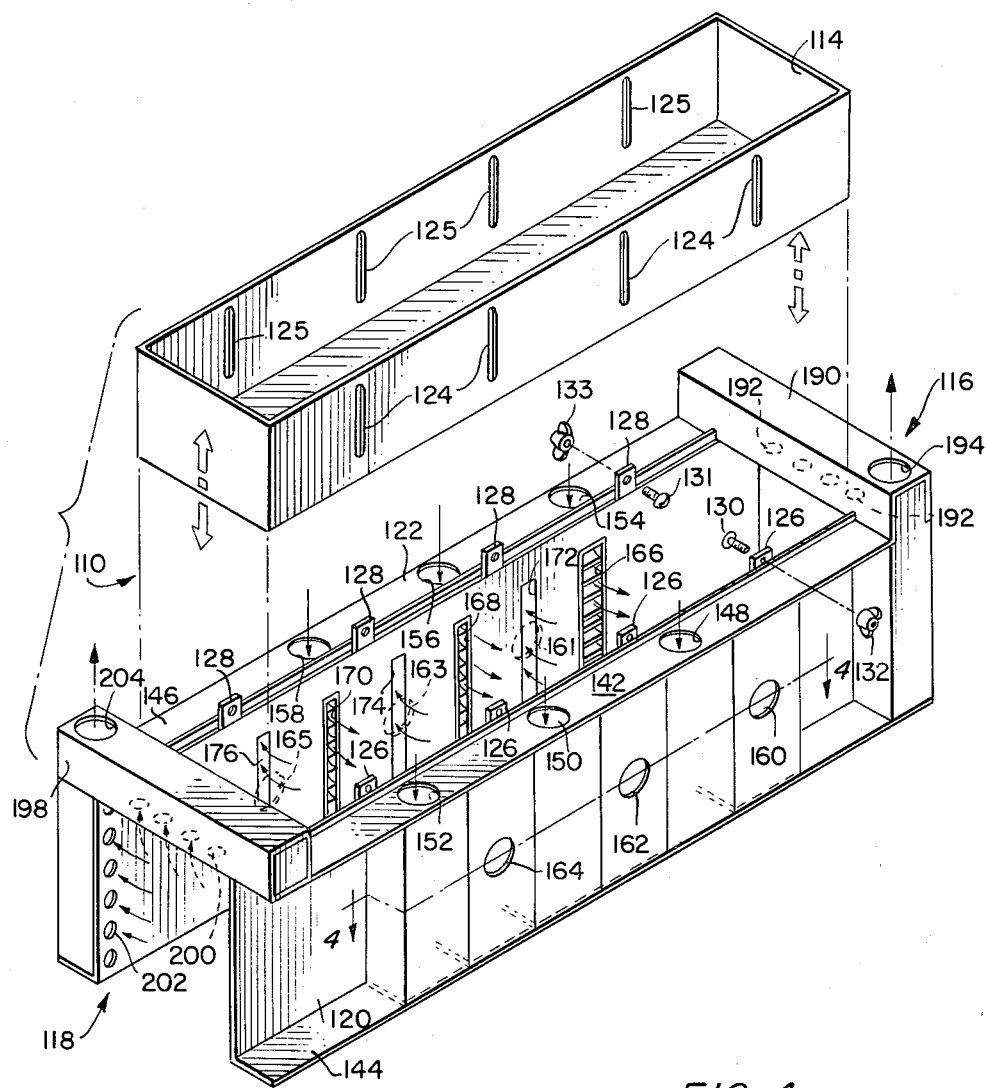
FIG. 3 is an exploded perspective view of a coating hood constructed in accordance with the principles of this invention, such view omitting the blowers and related piping for the sake of clarity.
Figure 4:
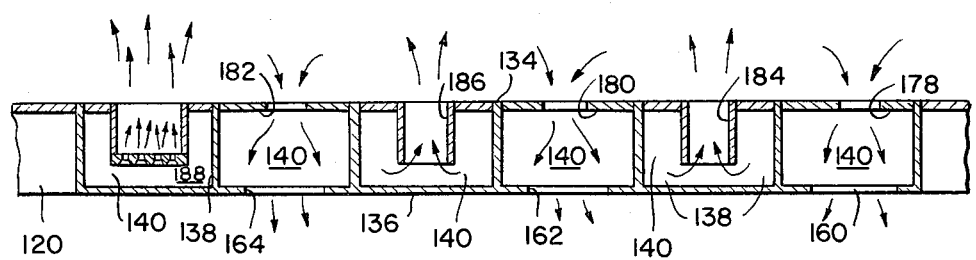
FIG. 4 is a horizontal cross-sectional view through one of the side walls of the hood, such view being taken along line 4—4 in FIG. 3 and in the direction indicated.

FIGS. 3 and 4 clearly show that the side wall 120 of the coating hood 110 includes an interior wall 134 and a spaced, exterior wall 136. A plurality of columns 138 extend the full height of the walls 134, 136 and divide the hollow area between the walls into six distinct chambers 140. A longitudinally extending ceiling 142 and a parallel longitudinally extending base 144 substantially seal off the upper and lower ends of chambers 140. The opposing side wall 122 of the coating hood is subdivided into six distinct chambers in a similar fashion. Only the ceiling 146 of the chambers is visible in FIG. 3. The chambers defined within side wall 122 are identical to, and longitudinally aligned with, the chambers defined within side wall 120.

A first aperture 148 is located in the ceiling 142 of the second chamber 140 in side wall 120, a second aperture 150 is located in the ceiling of the fourth chamber 140 in side wall 120, and a third aperture 152 is located in the ceiling of the sixth chamber in side wall 120. On the opposing side wall 122, a first aperture 154 is located in the ceiling 146 of the first chamber, a second aperture 156 is located in the ceiling 146 of the third chamber, and a third aperture 158 is located in the ceiling of the fifth chamber. The apertures enable communication with the chambers 140 defined in the side walls 120, 122 as suggested by the vertically extending directional arrows shown in FIG. 3.

Figure 5:
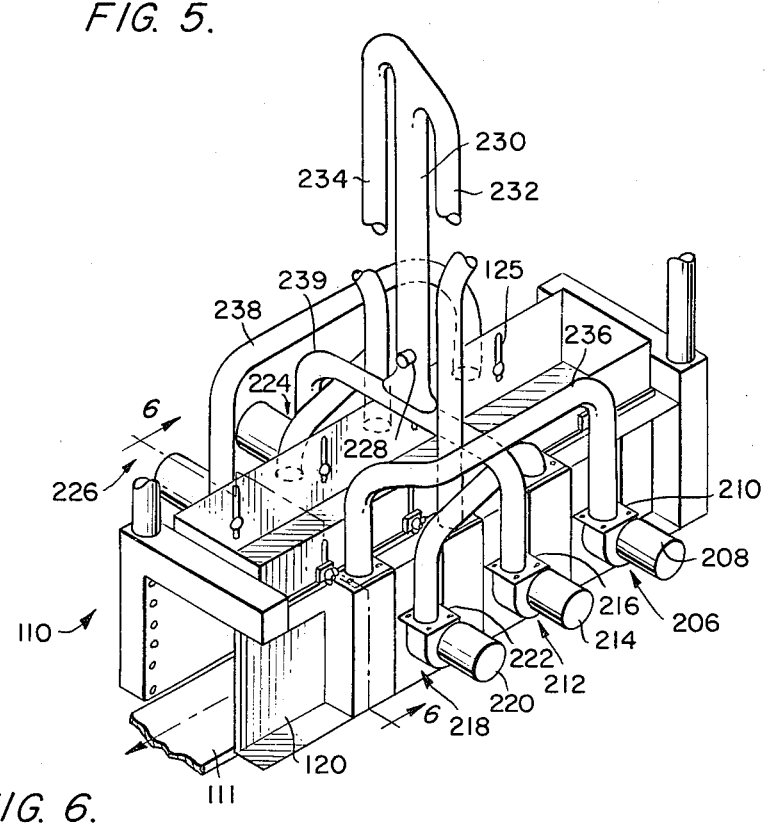
FIG. 5 is a perspective view of the preferred embodiment of a coating hood constructed in accordance with the principles of instant invention, such view including the piping and blowers omitted in FIG. 3.

A first port 160 opens outwardly from the first chamber 140 closest to the inlet end 116 of the hood 110, and port 160 allows the chamber to be vented. A second port 162 opens outwardly from the third chamber 140, and a third port 162 opens outwardly from the fifth chamber 140. In a similar fashion, a first port 161 (shown in dotted outline in FIG. 3) opens outwardly from the second chamber formed in the opposing side wall 122, a second port 163 (shown in dotted outline) opens outwardly from the fourth chamber formed in side wall 122, and a third port 165 (shown in dotted outline) opens outwardly from the sixth chamber formed in side wall 122. Each port communicates with the inlet end of a blower, as shown in FIG. 5.

A first jet slot 166 is located in the inner wall of the first chamber in side wall 122, a second jet slot 168 is located in the inner wall of the third chamber of side wall 122, and a third jet slot 170 is located in the inner wall of the fifth chamber of side wall 122. A first suction slot 172 opens into the second chamber of side wall 122 and communicates with outlet port 161, a second suction slot 174 opens into the fourth chamber of side wall 122 and communicates with outlet port 163, and a third suction slot 176 opens into the sixth chamber of side wall 122 and communicates with outlet port 165.

The suction slots, 172, 174, 176 are identical in size. However, the jet slot 166 is the largest of the three slots, slot 170 is intermedicate in size or equal to the smaller slot 168.

FIG. 4 shows that suction slots 178, 180 and 182 open into the first, third and fifth chambers 140, respectively, formed within side wall 120. The suction slots are identical in size to the suction slots in the opposing side wall, but open into difference chambers. Three jet slots slots 184, 186 and 188 are located in the inner wall of the side wall 120 in the second, fourth and sixth chambers 140. Jet slot 188 is the largest, jet slot 184 is the smaller, and jet slot 186 is intermediate in size or equal to slot 184.

An exhaust chamber 190 is situated at the leading end 116 of the coating hood. The chamber comprises a hollow, L-shaped member. Several small holes 192 are formed in the horizontal arm of the L-shaped member and additional small holes (not shown) are formed in the vertical leg of the L-shaped member. An exhaust port 194 is situated at the juncture of the vertical leg and horizontal arm, so that a suction force passing through port 194 will exhaust the area at the leading end 116 of the coating hood 110.

A similar, but laterally reversed exhaust chamber 198 is situated at the trailing end 118 of the coating hood. The chamber 198 comprises a hollow, L-shaped member. Several small holes 200 are formed in the horizontal arm of the L-shaped member and additional small holes 202 are formed in the vertical leg of the L-shaped member. An exhaust port 204 is situated at the juncture of the vertical leg and the horizontal arm, so that a suction force passing through port 204 will exhaust the area at the trailing edge 118 of the coating hood 110.

FIG. 5 shows additional details of the coating hood 110, particularly the blowers, the piping, and a feedpoint for the coating compound. A first blower 200, comprising a motor 208 for rotating fan 210, at high speeds, is secured about the outlet port 160 opening outwardly from the first chamber in side wall 120. The motor and the fan are enclosed within suitable housings. A second blower 212, comprising a motor 214 for rotating fan 216, at high speeds, is secured about the outlet port 162 opening outwardly from the third chamber in side wall 120. A third blower 218, comprising a motor 220 for rotating fan 222, at high speeds, is secured about the outlet port 164 opening outwardly from the fifth chamber in side wall 120.

A first blower 223 (not shown in FIG. 5 but visible in FIG. 8) is secured about the outlet port opening outwardly from the second chamber in the side wall 122, a second blower 224 is secured about the outlet port opening outwardly from the fourth chamber in the side wall 122, and a third blower 226 is secured about the outlet port opening outwardly from the sixth chamber in the side wall 122. Only the outlines of the motor housings for the second and third blowers 224, 226 are visible in FIG. 5.

An inlet port 228 in the central leg 230 of a distributor introduces pressurized air and the coating compound over conduit 232 into the fourth chamber 140 in the side wall 120 and over conduit 234 into the third chamber in the side wall 122. The inlet side of the first blower 206 secured to side wall 120 receives the air issuing from jet slot 166 via outlet port 160. Blower 206 imparts high valocity to the air and discharges same at its outlet side into conduit 236 leading to the sixth chamber 140 in the side wall 120. The rapidly moving air is discharged from the jet slot 188 in the sixth chamber toward the suction slot 176 in the opposing side wall 122. After passing through the suction slot 176 into the outlet port 165 opening outwardly from the sixth chamber in side wall 122, the blower delivers same over conduit 238 to the first chamber in side wall 122. The air is discharged from jet slot 166 to complete the outer recirculating loop for the hood 110.

In a similar fashion, as intermediate recirculating loop is defined including blowers 218 and 223, jet slots 170 and 184, and suction slots 172 and 182. Lastly, as inner recirculating loop is defined including blowers 212 and 224, jet slots 168 and 186, and suction slots 180 and 184. A conduit 239 extends over the hood and connects the chambers in the opposing side walls 120, 122 together. The interaction of the inner, intermediate, and outer recirculation loops will be discussed at a later point in the specification with particular reference to FIG. 8.

Figure 6:
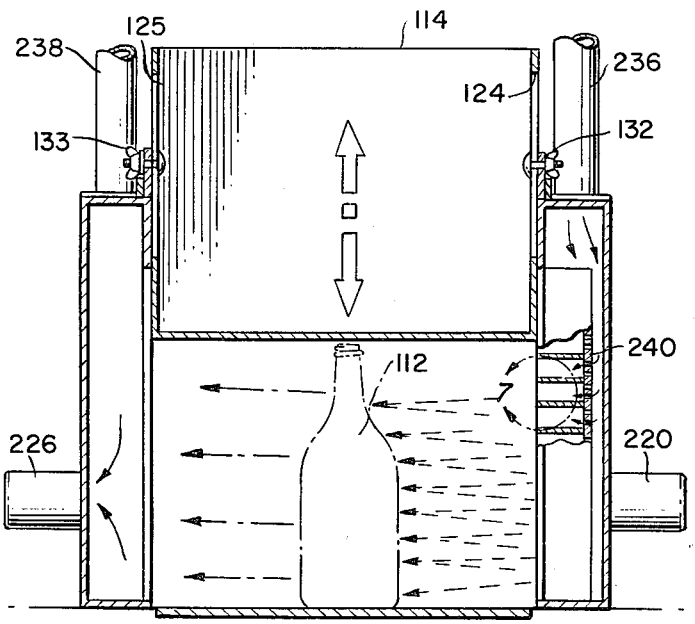
FIG. 6 is a vertical cross-sectional view through the coating hood, such view being taken along the line 6—6 in FIG. 5 and in the direction indicated.

The extent of the vertical adjustment of the top 114 of the hood 110 can best be appreciated by reference to FIG. 6. By simply adjusting the wing nuts 132, 133, the top can be adjusted along the vertical extent of slots 124, 125. This simple expedient permits the coating hood to coat glass containers 112 of various heights with equal success. When the top 114 is lowered to accomodate smaller containers, the side walls of the top blank out the unneeded upper ends of the several air jets.

Figure 7:
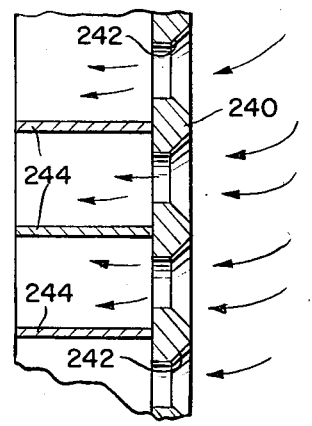
FIG. 7 is a vertical cross-sectional view of a baffle, such view being taken on an enlarged scale within insert "7" shown in FIG. 6.

FIG. 7, which is an enlarged view of the aspect of the coating hood 110 shown in the circular inset of FIG. 6, shows a baffle 240 in detail. The baffle 240 is situated within the sixth chamber 140 in side wall 120. Vertical columns and horizontal rows of apertures 242 are formed in the rear wall of the baffle. Horizontally projecting ribs 244 coact with the apertures to produce a substantially even flow of air over the full height of the coating chamber, as suggested by the directional arrows in FIG. 7. The baffle 240 in the sixth chamber 140 of the side wall 120 is identical to the baffle disposed in the largest jet slot 166 situated in the first chamber of the side wall 122. The ribs of the baffle in the jet slot 166 are also visible in FIG. 3.

Figure 8:
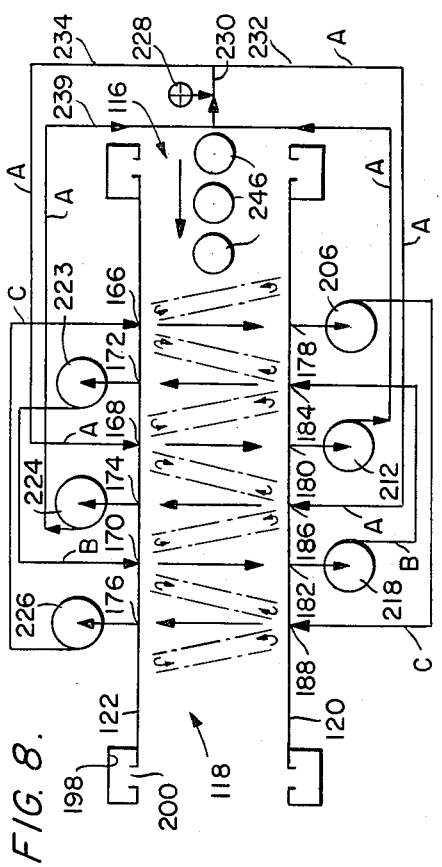
FIG. 8 is a schematic representation of the preferred embodiment of the instant, unique coating hood, such representation depicting the operation of the spray hood shown in FIGS. 3-7.

FIG. 8 schematically depicts the coating hood configuration and operational characteristics of the unique coating hood 110 depicted in FIGS. 3–7. The coating hood 110 employs a feedpoint 228 for introducing coating compound into cross-over 239 and conduits 232 and 234.

The coating compound may alternatively be introduced into blowers 212 and 224 of the inner loop of the three recirculating loops depicted in the preferred embodiment of FIGS. 3–7. Considering blower 212 as an arbitrary starting point, and assuming that the coating hood has been primed for operation, the blower 212 delivers air and coating compound at a high velocity to jet slot 186 in the fourth chamber of side wall 120. The air and coating compound are discharged toward aligned suction slot 174 in side wall 122. The air and the coating compound that do not adhere to a glass container passing thereby will enter slot 174, and pass into the inlet side of blower 224. Blower 224 transports air and coating compound over conduit 239, 230 and 234. The air and coating compound are discharged through jet slot 168, and the air and unreacted coating compound are received at jet slot 180 in side wall 122, which leads to the low pressure, inlet side of blower 212. Blower 212 transports air and coating compound over conduit 239 to join the discharge of blower 224 in conduit 230 and recirculates over conduit 232 to jet slot 186. The recirculating loop defined, inter alia, between blowers 212 and 224, jet slots 168 and 186, and suction slots 174, 180, comprises the inner loop of the three recirculating loops. The inner recirculating loop is identified by reference character A in FIG. 8.

The intermediate recirculating loop, which includes, inter alia, blowers 218 and 223, jet slots 170 and 184, and suction slots 172 and 182, is identified by reference character B in FIG. 8. The outermost recirculating loop, which includes, inter alia, blowers 206 and 226, jet slots 166 and 188, and suction slots 176 and 178, is identified by reference character C in FIG. 8. Coating compound introduced at feedpoint 228 is fed into loop A to replenish same carried by the high velocity, recirculating air stream. Some of the coating compound will react with each glass container passing through the hood.

As the glass containers 246 pass in single file through hood 110, the right side of the container is coated first, then the left side, then the right side, then the lieft side, then the right side and, lastly, the left side for a third time. The jet slots and the receiver slots are interspersed in an alternating fashion in each side wall. As shown in FIG. 8, the inner edge of the jet issuing from jet slot 166 toward the receiver slot 178 leading to the inlet port of blower 206 passes close by the edge of the oppositely directed jet issuing from jet slot 184 toward the receiver slot 172 leading to the inlet port of blower 223. The outer jets are fan-shaped when viewed in a top plan view, and extend vertically over the height of the hood 110. The jets of the inner and intermediate loop may extend only over the height required to blow against the lower part of the passing bottle. Turbulent eddy currents are set up between the oppositely directed jets, as suggested by the curved rotational arrows between adjacent jets. The swirling motion of the air between the jets causes the transfer of the coating compound introduced into loop A to vigorously mix with the high speed air flowing in the intermediate loop B. Consequently, the swirling motion of the air flowing between the jets of loop B and loop C causes the transfer of the unreacted coating compound to outmost loop C. After passing through loop C, most of the coating compound has had a chance to react with the hot bottle surface, whereas the remainder enters the exhaust system 198 and may be vented to atmosphere.

The multiple loop recirculating system for hood 110 insures that the coating compound will be utilized effectively. The amount of coating compound is innermost loop A is highest; the amount of coating compound in intermediate loop B is somewhat reduced because some of the compound has been applied to the containers 246 and the transfer between loops A and B entails some additional decrease in coating compound. The amount of coating compound in loop C is reduced still further, and thus the quantity of coating compound passing into the exhaust for the coating hood is reduced far below the level if only loop A would have been present. In order to reduce the amount of coating compound even further, the outer loop may take the form of an air film, extending over the full full height of the coating chamber, as shown in FIG. 3 and have just enough speed to act as as air curtain, limiting the amount of ambient air passing into the hood by the amount entrained into the air flow jet. Having limited the amount of inflowing ambient air, the inner and intermediate loop may have a very high velocity without causing excessive amounts of diluting ambient air entering the hood. Such dilution would have an adverse effect on the coating deposition rate and therefore limit the optimum jetspeed to low values.

ALTERNATIVE EMBODIMENTS

Figure 9:
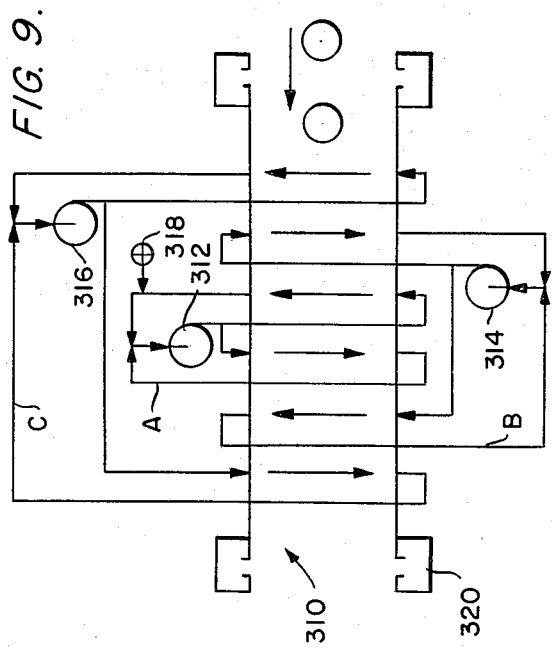
FIG. 9 is a schematic representation of a first alternative embodiment of a coating hood constructed in accordance with the principles of this invention.

FIG. 9 depicts schematically a first alternative embodiment of the instant coating hood. Whereas hood 110 required six blowers and several feedpoints to function satisfactorily, the alternative hood 310 of FIG. 9 requires only three blowers, identified as reference numerals 312, 314 and 316, and a single feedpoint 318. By using suitable T-connections and appropriate conduits, one blower is capable of providing a high velocity stream of air for each loop. For example, blower 312 services inner recirculating loop A, blower 314 services intermediate recirculating loop B, and blower 316 services outer recirculating loop C. The feedpoint 318 introduces coating compound into loop A, and the unreacted coating compound is transferred into loop B by the eddy currents established between the loops. Subsequently, after passing through loop B, the remaining unreacted coating compound is transferred into loop C. After circulating through loop C, the reduced proportion of unreacted coating compound is captured by exhaust 320 and vented to atmosphere. Alternatively, if commercially feasible, the coating compound in exhaust 320. The directional arrows extending between the receiver slots and the suction slots indicate the direction taken by the air moving rapidly through the recirculating loops A-C. The fan-shaped configuration of tha air flowing from the jet slots toward the suction slots has been omitted for the sake of clarity.

Figure 10:
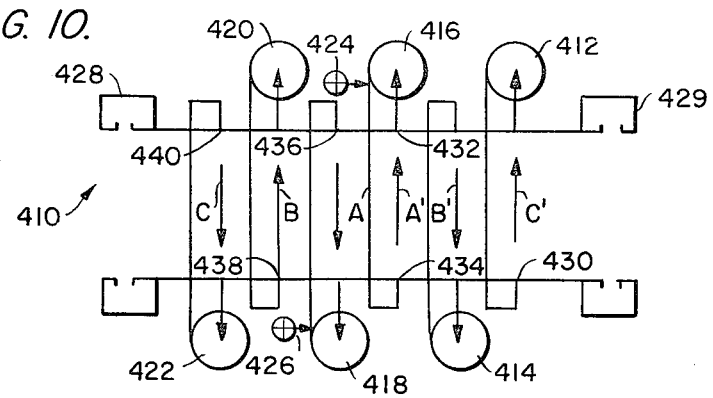
FIG. 10 is a schematic representation of a second, alternative embodiment of a coating hood constructed in accordance with the principles of this invention.

FIG. 10 schematically shows a second alternative embodiment of the instant coating hood, such embodiment being identified by reference numeral 410. Hood 410 employs six blowers 412, 414, 416, 418, 420 and 422, and two feedpoints 424 and 426. Three blowers are secured to each side wall of the hood, and an exhaust 428 is situated at the trailing end of hood 410, and exhaust 420 is situated at the leading end of hood 410. Jet slots 432, 436 and 440 are defined in one side wall of hood 410, and jet slots 430, 434 and 438 are defined in the opposing side wall. One suction slot is defined in the side wall opposite each jet slot.

Hood 410 includes a pair of inner recirculating loops A and A'. The coating compound is introduced over feedpoint 426 to recirculating loop A which, through eddy currents, transfer unreacted coating compound to intermediate recirculating loop B. Loop B, in turn, transfers unreacted coating compound to outermost loop C. Loop C, in turn, after contacting the containers passing through the hood, yields its unreacted coating compound to exhaust 428. In a similar fashion, inner loop A' transfer unreacted coating compound to intermediate loop B' and, in turn, to outer loop C' and thence to exhaust 429. The paths of the air flow issuing from the closely spaced, oppositely directed jets that form loops A-C and A'-C' are shown by the directional arrows of FIG. 10.

Figure 11:
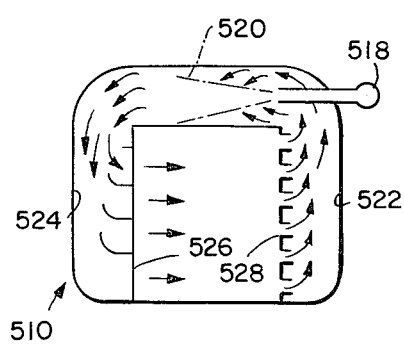
FIG. 11 is a schematic representation of the third alternative embodiment of a coating hood in accordance with the principles of this invention.
Figure 12:
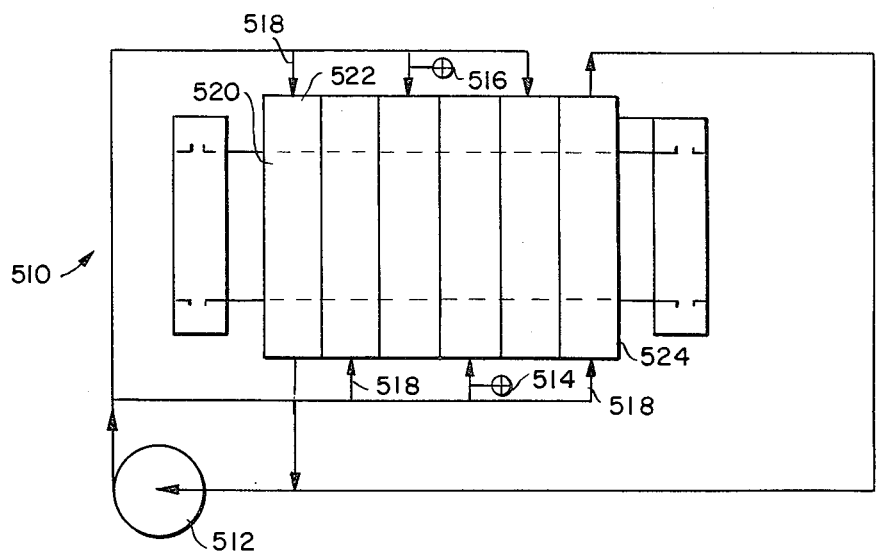
FIG. 12 is a plan view of the schematic representation of the embodiment of FIG. 11.

FIGS. 11-12 illustrate schematically a third alternative embodiment of the instant coating hood, such embodiment being identified by reference numeral 510. Hood 510 uses a single, high pressure blower 512 in lieu or the several small blowers employed in coatings hoods 210, 310 and 410. A first and a second feedpoint 514, and 516, respectively, introduce coating compound into the innermost loop of the several recirculating loops defined in hood 510. Air from the high, or outer, side of the blower is fed through the side walls at selected locations via nozzles 518. The air issuing from each nozzle is at sufficient valocity to pass through the hollow passage 510 that interconnects the side walls 522 and 524 of the hood. The fan-shaped configuration of the air issuing from nozzle 518 is suggested in FIG. 11. The high velocity of the air stream propels the air, and the coating compound entrained therein, through a jet slot 526, across the tunnel in the hood, and through a suction slot 528 defined in the opposing side wall. The plurality of recirculating air loops is formed in the same fashion as in hoods 210, 310 and 410, and the transfer of unreacted coating compound from the innermost to the outermost loop proceeds similarly.

Figure 13:
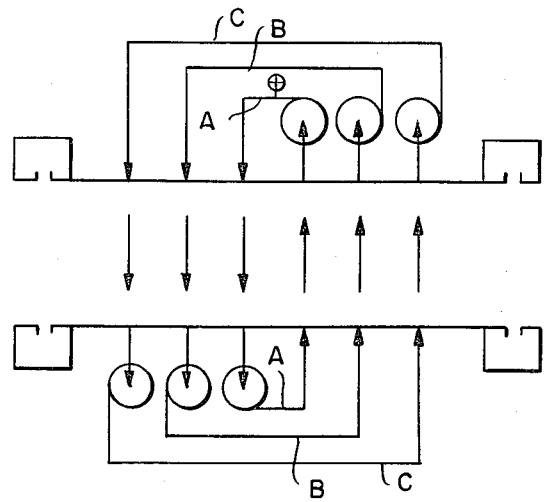
FIG. 13 is a schematic representation of a modification of the alternative embodiment of FIG. 12.

From the foregoing description of a preferred embodiment of a unique coating hood, 210, and from the description of alternative coating hoods 310 and 410 it is readily apparent that numerous changes, modifications and revisions in the hood configuration will be readily apparent to the skilled artisan. For example, in case of a well defined direction of ambient air flow along the hood of FIG. 10, the coating compound might be introduced into the second and third loops from the upwind direction instead of in the inner loops A and A'. More than one feedpoint may be used to introduce coating compound to the intermediate loop as well as to the innermost loop, variations in the height of the inner and intermediate air jets may be desirable, or even necessary, under certain operating conditions. In order to get even airflow over the full height of a jet slot, means other than the baffle shown in FIG. 3 may be used; for instance, a diverging nozzle with sufficient pressure drop to cause such an even flow. The direction of movement of the carrier gas (usually air) within each loop may be either clockwise or counterclockwise, alternating from one loop to the next, or all in the same direction as show in FIG. 13. The several embodiments of the instant glass coating hood lend themselves to utilization of commonly employed methods of minimizing the amount of coating compound being deposited on the neck and threads of the glass containers. Consequently, the appended claims should not be limited to their literal terms, but should be accorded a broad interpretation commensurate with the significant advance in the useful arts realized by this unique coating hood.

I claim:

1. A coating hood adapted to apply uniform protective coatings to glass containers, said hood comprising:
   (a) a pair of spaced side walls,
   (b) a top extending between said side walls to form a tunnel to permit glass containers to pass therethrough,
   (c) a plurality of jet forming means defined in said side walls,
   (d) a plurality of receivers defined in said side walls,
   (e) said receivers being situated in substantial lateral alignment with said jet forming means but in the side wall opposite thereto for receiving the output from said jet forming means,
   (f) at least one feedpoint for introducing a coating compound into the hood,
   (g) blower means and conduit means connected thereto for delivering a carrier gas at high velocity to said jet forming means with the coating compound entrained therein,
   (h) said jet forming means being spaced longitudinally apart a sufficient distance to issue a plurality of jets, half of them in one direction and the other half in opposite direction across the lateral dimension of the hood,
   (i) whereby unreacted coating compound can be transferred from jet to jet along the longitudinal extent of said hood,
   (j) said jet forming means and said receiver are divided into an inner loop and an outer loop,
   (k) each loop comprising a pair of adjacent jet forming means,
   (l) a pair of receivers disposed in alignment therewith,
   (m) and conduit means connecting said jet forming means to said receivers so that at least two continuous loops are formed for recirculating the carrier gas with coating compound entrained therein.

2. A coating hood as defined in claim 1 wherein the jet of said outer loop extends over substantially the full height of said hood and has a suitable speed to serve as an air curtain.

3. A coating hood as defined in claim 1 wherein each of said receivers comprises a suction slot formed in a side wall, all of said suction slots possessing the same dimensions.

4. A coating hood as defined in claim 1 wherein each of said jet forming means comprises a jet slot formed in a side wall.

5. A coating hood as defined in claim 4 wherein said jet slots are of different dimensions and a baffle is secured within the largest one of said jet slots.

6. A coating hood as defined in claim 5 wherein said baffle comprises a vertically extending plate, horizontally extending ribs projecting therefrom toward the interior of said hood, and said vertically extending plate has apertures formed therein to allow air to pass therethrough.

7. A coating hood as defined in claim 1 wherein said blower means and said conduit means deliver the carrier gas at its highest velocity to the innermost jet forming means.

8. A coating hood as defined in claim 1 wherein the feedpoint is connected to the innermost receiver of said hood.

9. A coating hood as defined in claim 1 wherein said hood has an entrance which admits the glass containers prior to coating same and an exit edge therefor, first exhaust means located at the entrance of the hood and second exhaust means located at the exit thereof.

10. A coating hood as defined in claim 8 wherein said exhaust means comprises a hollow member with several small apertures formed therein.

11. A coating hood as defined in claim 1 wherein each side wall comprises an interior wall and a spaced exterior wall, and a plurality of columns extend the height of the walls to divide the area between the interior and exterior walls into distinct chambers.

12. A coating hood as defined in claim 1 wherein said top is shaped as an upwardly opening box with a bottom, end walls and side walls, aligned slots are formed in side walls, and fasteners extend through said slots so that said top can be adjusted relative to said side walls to alter the effective height of said coating hood.

13. A coating hood as defined in claim 1 wherein said top comprises a cross-over passage that communicates, at opposite ends, with both of said side walls.

14. A coating hood as defined in claim 1 wherein said blower means comprises six blowers, three of said blowers being secured to one of said side walls and the other three of said blowers being secured to the other one of said side walls.

15. A coating hood as defined in claim 1 wherein said blower means includes an inlet, as outlet, a fan, and a motor for driving the fan so that the blower discharges carrier gas at high velocity through its outlet, and wherein said side walls have outlet ports formed therin, each outlet port opening outwardly to communicate with the inlet of said blower means.

16. A coating hood as defined in claim 14 wherein each receiver communicates with an outlet port disposed in alignment therewith.

17. A coating hood as defined in claim 1 wherein said jet assumes a triangular form when viewed from above, with the apex of the triangle issuing from the jet slot.

18. A method for operating a coating hood to apply uniform protective coatings to heated glass containers, said spray hood comprising an entrance, an exit, and a tunnel region, a plurality of spaced carrier gas and entrained coating compound delivery means and receiving means in opposite sides of said tunnel, at least one feed point for introducing coating compound into said tunnel, said method comprising the steps of:
  (a) passing glass containers through the tunnel,
  (b) forming a circulating inner loop including a pair of jet forming means and suction slots, delivering
  (c) coating compound to an inner circulating loop of carrier gas from which the unreacted compound is transferred to an outer loop of carrier gas,
  (d) coating the container passing thereby.

19. The method claim 18 further comprising the step of establishing additional intermediate circulating loops between said inner loop and said outer loop for further increasing the efficacy of the coating method.

20. The method of claim 18 comprising the steps of forming the outer circulating loop by jets extending over substantially the full height of the coating hood whereby said jets function as air curtains.

21. The method of claim 19, further comprising the steps of intermixing of eddy currents established by adjacent loops such that unreacted coating compound is transferred from recirculating loop to adjacent recirculating loop.

22. The method claim 18 in which the velocity of at least the inner loop is sufficient to create turbulence at the surface of the glass containers.

* * * * *